United States Patent
Dellach

(10) Patent No.: US 8,443,653 B2
(45) Date of Patent: May 21, 2013

(54) BREAKAWAY TOOLING APPARATUS

(75) Inventor: Kenneth P. Dellach, Shelby Township, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 527 days.

(21) Appl. No.: 12/620,706

(22) Filed: Nov. 18, 2009

(65) Prior Publication Data

US 2010/0147053 A1 Jun. 17, 2010

Related U.S. Application Data

(60) Provisional application No. 61/122,944, filed on Dec. 16, 2008.

(51) Int. Cl.
*G01M 3/02* (2006.01)

(52) U.S. Cl.
USPC .............................................. 73/37

(58) Field of Classification Search
USPC .............................................. 73/37
See application file for complete search history.

(56) References Cited

U.S. PATENT DOCUMENTS

| | | | |
|---|---|---|---|
| 4,500,065 A | 2/1985 | Hennekes et al. | |
| 4,643,632 A | 2/1987 | Beyer | |
| 4,995,493 A | 2/1991 | Cotsman et al. | |
| 5,002,173 A | 3/1991 | Hucul et al. | |
| 5,086,901 A | 2/1992 | Petronis et al. | |
| 5,964,124 A * | 10/1999 | Nunes et al. | 74/490.01 |
| 6,214,057 B1 | 4/2001 | Spencer et al. | |
| 6,690,208 B2 | 2/2004 | Gloden et al. | |
| 2008/0226427 A1 * | 9/2008 | Van Zile | 414/14 |

FOREIGN PATENT DOCUMENTS

| | | |
|---|---|---|
| DE | 33 10 069 A1 | 10/1984 |
| DE | 37 01 651 A1 | 8/1988 |
| GB | 2 127 775 A | 4/1984 |

* cited by examiner

*Primary Examiner* — David A. Rogers
*Assistant Examiner* — Alex Devito
(74) *Attorney, Agent, or Firm* — Young Basile Hanlon & MacFarlane P.C.

(57) ABSTRACT

A breakaway tooling apparatus connectable to a manipulator and at least one tool for limiting the amount of damage to the associated manipulator and tool when the apparatus accidentally engages an obstacle. The detection mount has a narrowed neck region and stepped throughbore adjacent the narrowed neck region for creating a weakened portion that will fracture upon the realization of a predetermined force to the detection mount. An air passageway extends from an outer portion of the detection mount to an inner portion of the detection mount, wherein the air passageway is connectable to a supply of pressurized air. A blocking member prevents the pressurized air from passing through the air passageway in the detection mount when the detection mount is not fractured at the weakened portion, and the blocking member allows pressurized air to flow through the air passageway in the detection mount when the detection mount is fractured at the weakened portion. A pressure indicator determines whether the air pressure in the air passageway is above or below a predetermined air pressure level, thereby indicating whether the detection mount is fractured at the weakened portion.

9 Claims, 7 Drawing Sheets

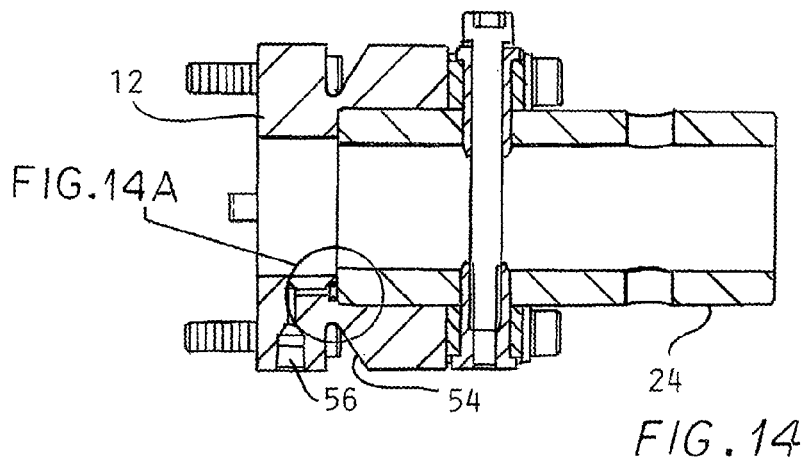
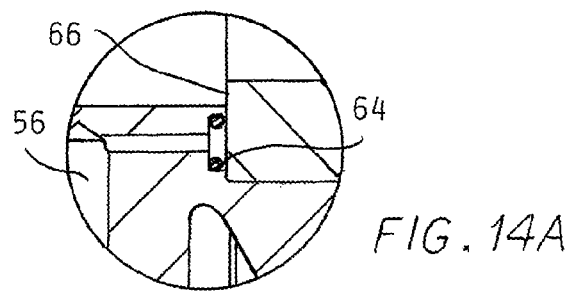
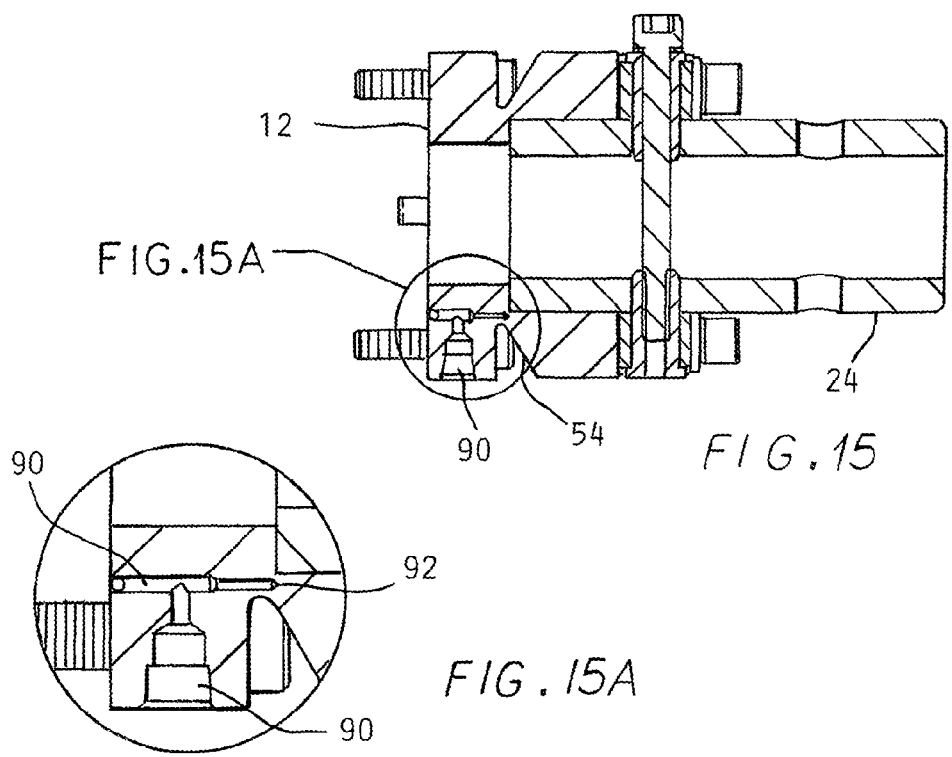

BREAKAWAY TOOLING APPARATUS

CROSS-REFERENCE TO RELATED APPLICATION

The present application is a formalization of U.S. Provisional Patent Application Ser. No. 61/122,944, filed on Dec. 16, 2008.

FIELD OF THE INVENTION

The present invention relates to industrial tooling, and in particular, an industrial breakaway tooling apparatus that is designed to break in a predetermined region and indicate whether the breakaway tooling apparatus has broken so as to prevent any further damage of the industrial tooling and any associated manipulator thereof.

BACKGROUND OF THE INVENTION

In today's industries, robotic equipment is being used for a wide variety of applications. Such applications may attach some form of tooling to a mechanical wrist or end of a robotic arm via a mounting face plate or some form of bracketry. Much of the tooling has become versatile, complex, and modular so that the tooling can be used for various applications and workpieces. Such modular tool designs tend to be more expensive than conventional designs, since a greater amount of engineering, design, and material costs are invested into the modular tooling. Thus, any damage to the modular tooling can be rather expensive and costly to the manufacturer.

Occasionally, the robotic system and/or its tooling may encounter unexpected obstacles in a manufacturing environment. If the robotic system and/or the modular tooling impacts the obstacle with sufficient force, or if the robotic system continues to move once the modular tooling has come into contact with the obstacle, the robotic system and/or the modular tooling may become damaged. Further damage may occur if the robotic system is not stopped after the initial damage occurs.

Thus, it would be desirable to provide a robotic system and/or modular tooling system that reduced the amount of damage to the modular tooling and/or the robotic system upon encountering unexpected obstacles by immediately stopping the robotic system upon damage to the modular tooling.

SUMMARY OF THE INVENTION

The present invention provides a breakaway tooling apparatus connectable to a manipulator and at least one tool for limiting the amount of damage to the associated manipulator and tool when the manipulator and/or tool accidentally engage an obstacle. The breakaway tooling apparatus of the present invention provides a detection mount connectable to the manipulator and the tool wherein the detection mount has a weakened portion for allowing the detection mount to fracture at said weakened portion upon the realization of a predetermined force to the detection mount. The detection mount has an air passageway having at least a portion thereof in close proximity to the weakened portion of the detection mount. The air passageway is in communication with a pressurized air source such that the pressurized air is prohibited from passing through the air passageway when the detection mount is not fractured at the weakened portion, and wherein pressurized air is allowed to pass through the air passageway when the detection mount is fractured at the weakened portion. A pressure sensor is in communication with the pressurized air for determining whether the pressurized air in the air passageway is below a predetermined level of air pressure, thereby indicating whether the detection mount is fractured at the weakened portion.

In one embodiment, the air passageway in the detection mount may extend from a first end, wherein the first end is in communication with the pressurized air supply, to a second end, which opens to an inner surface of the detection mount. A blocking member engages the second end of the air passageway to prevent the pressurized air from passing through the second end of the air passageway when the detection mount is not fractured at the weakened portion. The blocking member allows pressurized air to pass through the second end of the air passageway when the detection mount is fractured at the weakened portion. The blocking member may be fabricated from a substantially cylindrical ring connected to the detection mount. In the alternative, the blocking member may be fabricated from at least a portion of the tool connected to the detection mount. A flexible seal may be disposed between the second end of the air passageway and the blocking member for providing a sealed engagement between the second end of the air passageway and the blocking member when the detection mount is not fractured at the weakened portion.

In another embodiment, the air passageway and the detection mount may extend from a first end to a second end, wherein the first end is in communication with the pressurized air source. The second end of the air passageway may have a closed end within the detection mount adjacent to the weakened portion of the detection mount, wherein pressurized air cannot pass through the second end of the air passageway when the detection mount is not fractured at the weakened portion, and wherein the pressurized air may pass through the second end of the air passageway when the detection mount is fractured at the weakened portion, thereby opening the second end of the air passageway.

The detection mount may have a stepped throughbore adapted to receive the tool, and the inner diameter of the stepped throughbore may be adjacent to the weakened portion of the detection mount. The weakened portion of the detection mount may be fabricated by a narrowing neck region of the detection mount such that the detection mount will fracture at the narrowing neck portion upon the realization of the predetermined force applied to the detection mount.

An air pressure regulator in communication with the supply of pressurized air may be utilized for regulating and monitoring the level of pressurized air to the air passageway in the detection mount.

Other objects, features, and advantages of the present invention will become apparent with reference to the following specification and to the drawings.

BRIEF DESCRIPTION OF THE DRAWINGS

The description herein makes reference to the accompanying drawings wherein the referenced numerals refer to like parts throughout several views and wherein:

FIGS. 14-14A are sectional views of a second embodiment of the detection mount in the direction of arrows A-A in FIG. 5 of the breakaway tooling apparatus of the present invention; and FIGS. 15-15A are sectional views of a third embodiment of the detection mount in the direction of arrows A-A in FIG. 5 of the breakaway tooling apparatus of the present invention.

DETAILED DESCRIPTION OF THE EMBODIMENTS

Figure 1:
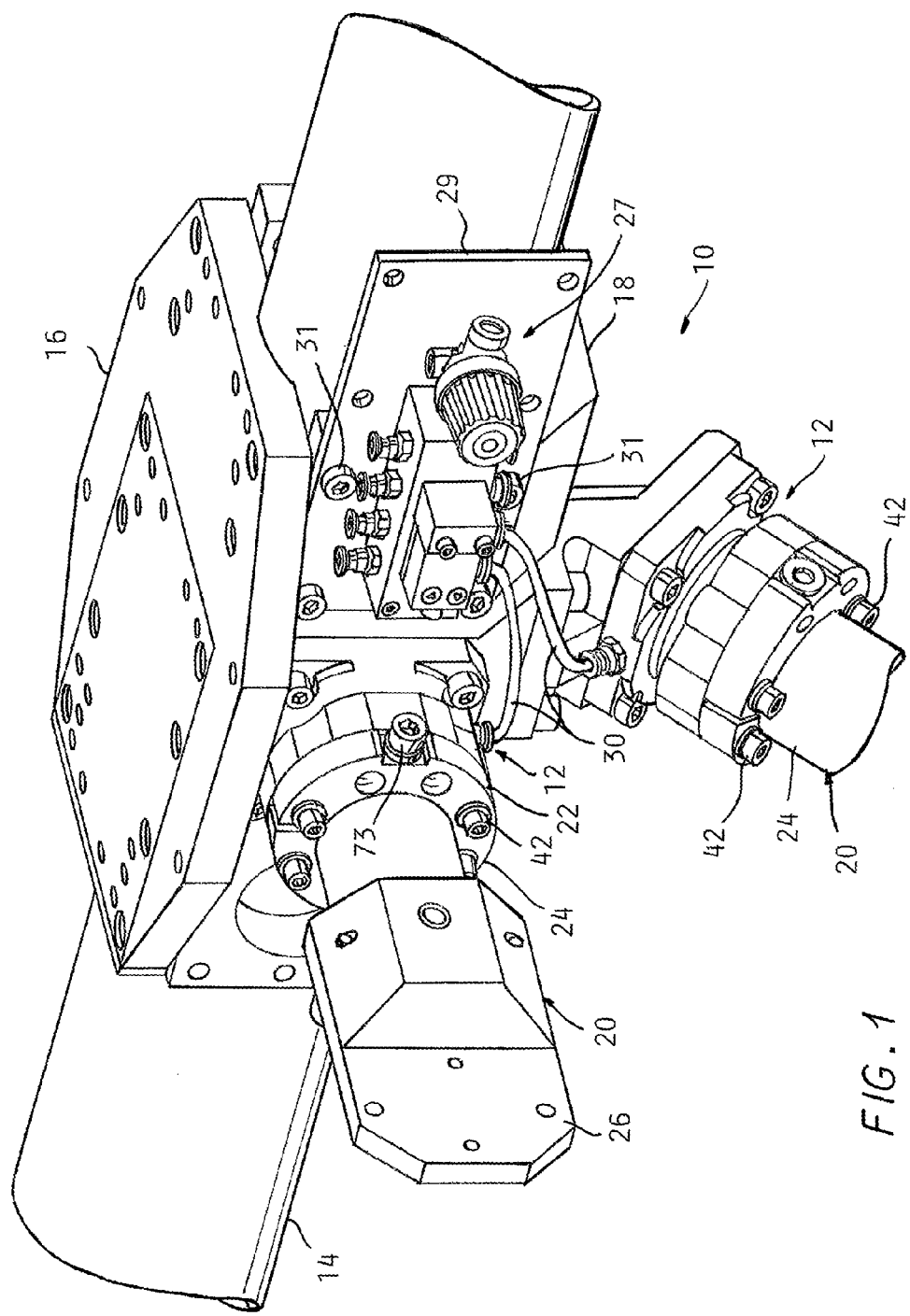
FIG. 1 is an isometric view of the breakaway tooling apparatus of the present invention.
Figure 2:
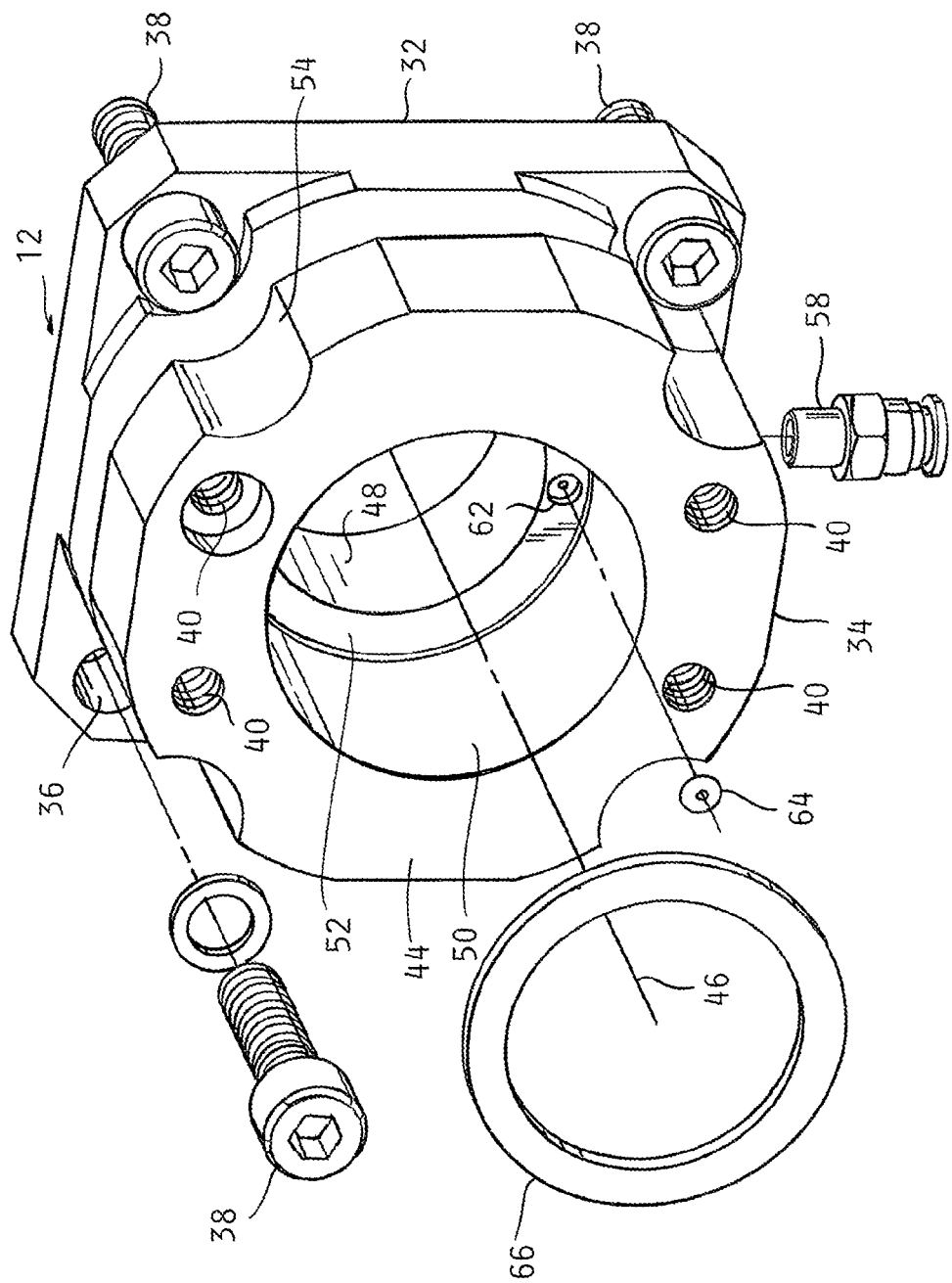
FIG. 2 is an exploded view of the detection mount of the breakaway tooling apparatus of the present invention.
Figure 3:
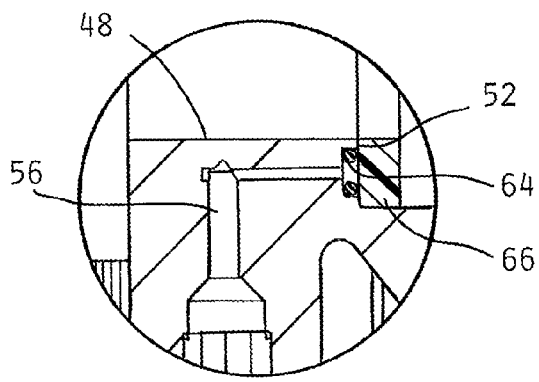
FIG. 3 is an enlarged sectional view of the passageway in the direction of arrows A-A in FIG. 5 of the breakaway tooling apparatus of the present invention.
Figure 4:
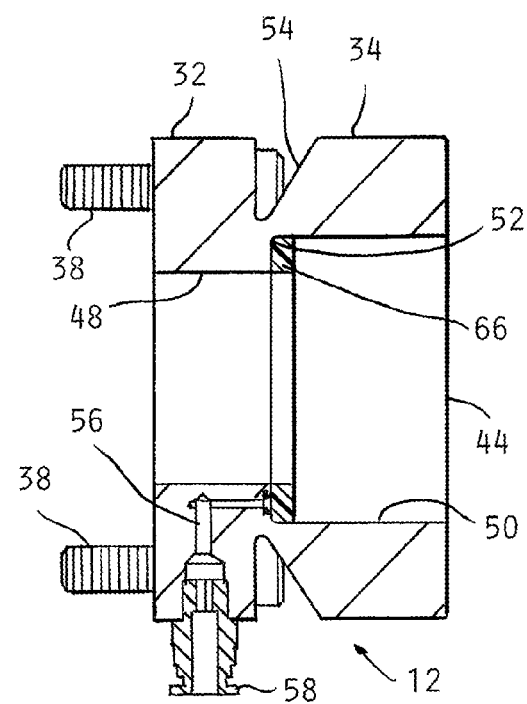
FIG. 4 is a sectional view of the detection mount in the direction of arrows A-A in FIG. 5 of the breakaway tooling apparatus of the present invention.
Figure 5:
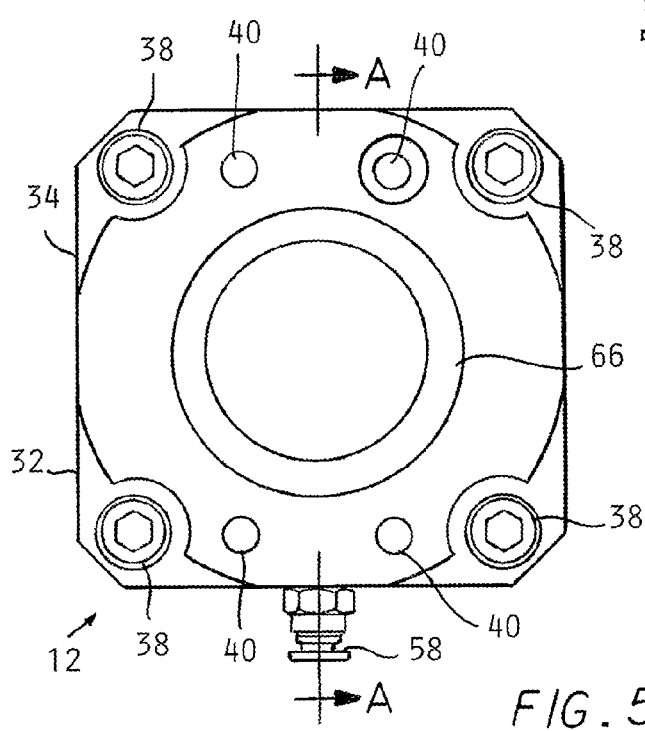
FIG. 5 is a plan top view of the detection mount of the breakaway tooling apparatus of the present invention.
Figure 6:
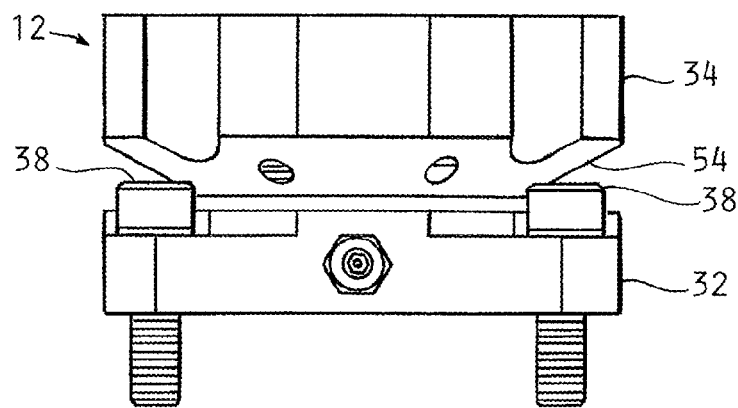
FIG. 6 is a plan front view of the detection mount of the breakaway tooling apparatus of the present invention.
Figure 7:
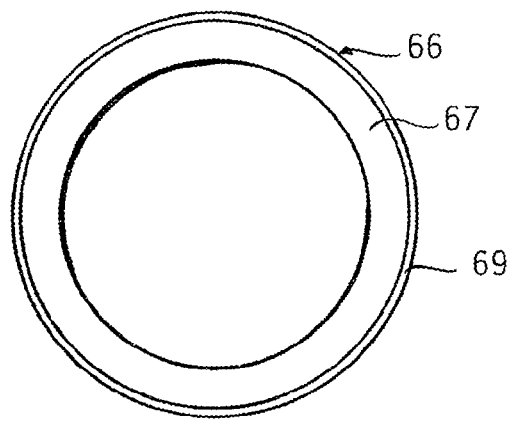
FIG. 7 is a plan front view of the blocking member of the breakaway tooling apparatus of the present invention.
Figure 8:
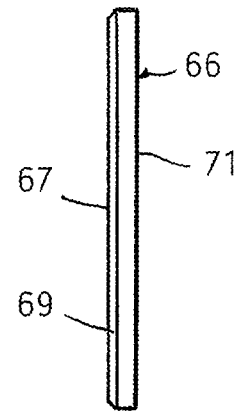
FIG. 8 is a plan right side view of the blocking member of the breakaway tooling apparatus of the present invention.
Figure 9:
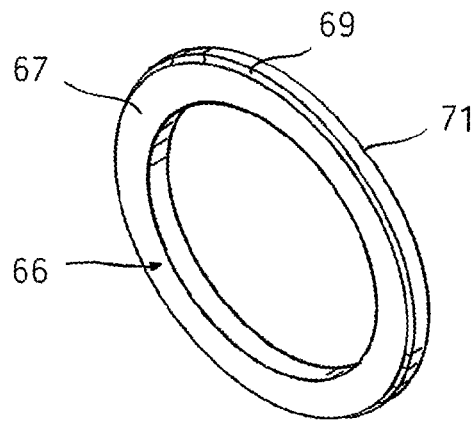
FIG. 9 is an isometric view of the blocking member of the breakaway tooling apparatus of the present invention.
Figure 10:
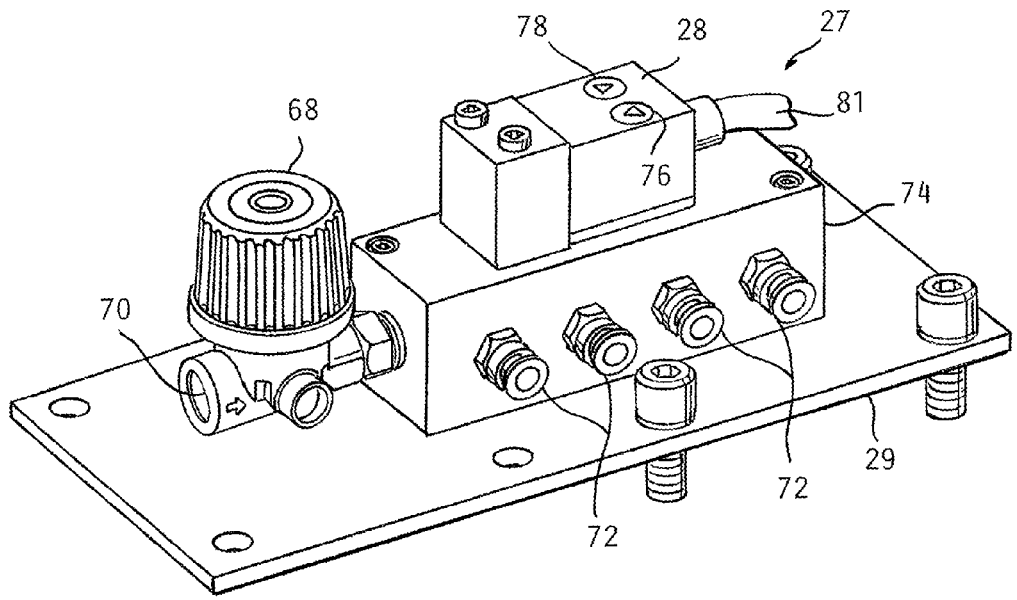
FIG. 10 is an isometric view of the air pressure system of the breakaway tooling apparatus of the present invention.

Referring to the drawings, the present invention will now be described in detail with reference to the disclosed embodiment.

The present invention provides a breakaway tooling apparatus 10 for allowing and indicating the fracturing of a detection mount 12 upon an unexpected force being applied to the detection mount 12, wherein the force is created by the breakaway tooling apparatus 10 unexpectedly engaging an obstacle (not shown). As seen in FIG. 1, the breakaway tooling apparatus 10 may be mounted to a master boom rod 14 of a manipulator (not shown), such as a conventional robotic system or robotic arm. A mounting plate 16 may be connected to the master boom rod 14 through the use of conventional fasteners (not shown) to assist in securing the breakaway tooling apparatus 10 to the master boom rod 14, and/or the mounting plate 16 may be used to connect the master boom rod 14 to the manipulator through the use of conventional fasteners (not shown). A bracket 18 may also be utilized to connect the breakaway tooling apparatus 10 to the master boom rod 14 through the use of conventional fasteners (not shown). The manipulator may move the master boom rod 14 and the breakaway tooling apparatus 10 to engage a workpiece (not shown).

The breakaway tooling apparatus 10 has at least one detection mount 12 that is mounted to the bracket 18; however, in FIG. 1, two similar detection mounts 12 are shown connected to the bracket 18. Each of the detection mounts 12 have a modular tooling assembly 20 connected thereto. The modular tooling assemblies 20 may provide a lock ring 22 for connecting a boom rod 24 to the detection mount 12 and a tooling mount 26 connected to the boom rod 24 for locating and securing a conventional tool (not shown) to the tooling mount 26. The tool may comprise a clamp, a gripper, a locator, a weld gun, a vacuum cup, etc. An air pressure system 27 is mounted to a mounting plate 29 which is connected to the bracket 18 through the use of conventional fasteners 31. Air lines or hoses 30 extend from the air pressure system 27 to each of the detection mounts 12. When the breakaway tooling apparatus 10 is operational, and the detection mount 12 is not fractured, the air pressure system 27 may provide an indication that the detection mount 12 is intact. When the detection mount 12 fractures due to the manipulator moving the modular tooling assembly 20 and having the modular tooling assembly 20 unexpectedly engage an obstacle with a force exceeding a predetermined level, the air pressure system 27 may provide an indication that the detection mount 12 is fractured. In addition, when the detection mount 12 fractures, the air pressure system 27 sends a signal to a control apparatus (not shown) of the manipulator to shut off and stop the manipulator from any further movement.

In order to connect the detection mount 12 to the bracket 18 and the modular tooling assembly 20, the detection mount 12 provides a substantially square mounting region 32 integrally connected to a substantially cylindrical boom rod mounting region 34, as seen in FIGS. 1-6. The substantially square mounting region 32 provides apertures 36 in each of the corners of the substantially square mounting region 32 that correspondingly align with apertures in the bracket 18. Each of the apertures 36 in the substantially square mounting region 32 receives a conventional fastener 38 that extends into each aperture in the bracket 18 for connecting the detection mount 12 thereto. The cylindrical mounting region 34 of the detection mount 12 also provides four threaded apertures 40 for receiving conventional fasteners 42 that connect the lock ring 22 to the detection mount 12. A stepped throughbore 44 extends through the substantially square mounting region 32 and the substantially cylindrical mounting region 34 of the detection mount 12 along a longitudinal axis 46 of the detection mount 12. The stepped throughbore 44 has a first diameter 48, which extends through the substantially square mounting region 32 of the detection mount 12, and a second diameter 50, which is larger than the first diameter 48 and extends through the substantially cylindrical mounting region 34 of the detection mount 12. A shoulder 52 is formed within the stepped throughbore 44 at the point in which the first diameter 48 and the second diameter 50 meet. The shoulder 52 is substantially perpendicular to the longitudinal axis 46 of the detection mount 12.

To provide a predetermined breakaway point or weakened portion in the detection mount 12, a narrowing neck region 54 is provided in the detection mount 12 in the area in which the substantially square mounting region 32 and the substantially cylindrical mounting region 34 of the detection mount 12 meet. The narrowing neck region 54 corresponds in alignment with the shoulder 52 of the stepped throughbore 44 of the detection mount 12. This corresponding alignment of the narrowing neck region 54 and the shoulder 52 creates a thinning of material in the detection mount 12 extending between the deepest point of the narrowing neck region 54 and the shoulder 52. This narrowing or thinning portion of material in the detection mount 12 provides a weakened area of the detection mount 12 such that the detection mount 12 will break or yield upon realizing a sufficient amount of force at or above a predetermined level in a direction that is substantially perpendicular to the longitudinal axis 46 of the detection mount 12. The narrowing neck region 54 of the detection mount 12 increases the likelihood that the detection mount 12 will fracture prior to any damage to the modular tooling assembly 20 or the manipulator. In order to assure that the fracturing of the detection mount 12 occurs at the narrowing neck region 54, the detection mount 12 is fabricated from a predetermined material having a predetermined strength. The detection mount 12 may be fabricated from a lightweight, high-strength material, such as aluminum.

In order to determine whether the detection mount 12 has fractured, an air passageway 56 extends from an outer surface of the substantially square mounting region 32 of the detection mount 12 to the internal shoulder 52 of the detection mount 12. An air hose fitting 58 is connected to the inlet of the air passageway 56 in the outer surface of the substantially square mounting region 32 of the detection mount 12. The air hose fitting 58 allows for the connection of the air hose 30, as will be discussed in detail later in the specification. An inlet of the air passageway 56 leads into the internal shoulder 52 of the detection mount 12, and a recess 62 is provided in the inlet for receiving a flexible O-ring 64. A blocking member 66 is seated on the shoulder 52 of the detection mount 12, and in this embodiment, the blocking member 66 is fabricated from a ring having a substantially flat surface 67 abutting the shoulder 52 so that the blocking member 66 forms a seal with the O-ring 64, as seen in FIGS. 3-5 and 7-9. The flat surface 67 of the blocking member 66 has a chamfered edge 69 to complementarily engage the transition between the shoulder 52 and the second diameter 50 of the detection mount 12. The blocking member 66 has an outside diameter that is substantially the same size as the second diameter 50 of the stepped throughbore 44 of the detection mount 12 and an inner diameter that is substantially the same size as the first diameter 48 of the stepped throughbore 44 of the detection mount 12. The blocking member 66 may be press fit in the second diameter 50 of the stepped throughbore 44 of the detection mount 12 to properly seat the blocking member 66 in the detection mount 12. The blocking member 66 may be fabricated from a lightweight, high-strength material, such as a metal or plastic.

The boom rod 24 is positioned in the second diameter 50 of the detection mount 12 through the use of the lock ring 22. As seen in FIG. 1, a fastener 73 extends substantially perpendicular to the longitudinal axis 46 of the detection mount 12 through apertures in the lock ring 22 and a corresponding aperture (not shown) in the boom rod 24 to secure the boom rod 24 in the detection mount 12. As previously described, the lock ring 22 is connected to the detection mount 12.

In order to provide and regulate pressurized air to the air passageway 56 in the detection mount 12, the air pressure system 27 of the breakaway tooling apparatus 10 provides an air pressure regulator 68 connected to an air manifold block 74 which is mounted to the mounting plate 29, as seen in FIGS. 1, 10, and 12-13. The pressure regulator 68 provides an air inlet 70 for receiving a supply of pressurized air, and the pressure regulator 68 regulates the supply of pressurized air to a plurality of air outlets having air hose fittings 72 mounted therein in the air manifold block 74. The pressure regulator 68 ensures that the air being provided to the air hose fittings 72 in the air manifold block 74 is maintained at a predetermined pressure level. For purposes of the present invention, the pressure regulator 68 provides relatively low air pressure to the air manifold block 74 and consequently to the air passageway 56 in the detection mount 12. The air hoses 30 are connected from the air hose fittings 72 in the air manifold block 74 to the air hose fittings 58 provided on the detection mounts 12 of the breakaway tooling apparatus 10.

In order to determine and indicate whether the detection mount 12 of the breakaway tooling apparatus 10 has fractured, a pressure indicator or switch 28 is connected to the air manifold block 74 for monitoring the air pressure within the air manifold block 74. The pressure indicator 28 may provide a green indicator light 76 that illuminates to indicate that the system has power and is operational. The pressure indicator 28 may also provide a red indicator light 78 to indicate that the pressure within the air manifold block 74 is at or above a predetermined pressure. If the pressure within the air manifold block 74 falls below a predetermined pressure level, then the red indicator light 78 is not illuminated. When the red indicator light 78 is not illuminated, then an electronic signal is provided from the pressure indicator 28 to a control apparatus (not shown), such as a programmable controller, of the manipulator indicating to the control apparatus that the detection mount 12 is fractured. In an alternative embodiment, the green indicator light 76 and the red indicator light 78 are not provided, and thus, the signal from the pressure indicator or switch 28 is provided directly to the control apparatus. An electric cable 81 may be connected from the pressure indicator 28 to the control apparatus for communicating the electronic signal. When the signal is sent to the control apparatus indicating that the detection mount 12 is fractured, the control apparatus immediately shuts down the manipulator and prevents the manipulator from continually operating with a fractured detection mount 12.

Figure 11:
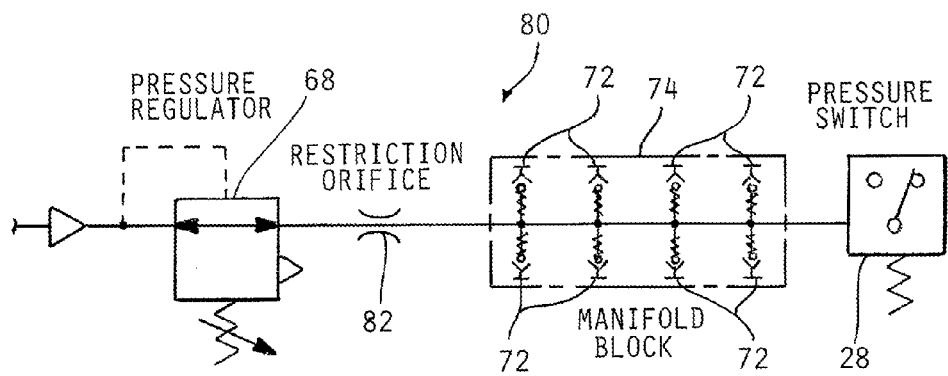
FIG. 11 is a circuit diagram of the air pressure system of the breakaway tooling apparatus of the present invention.
Figure 12:
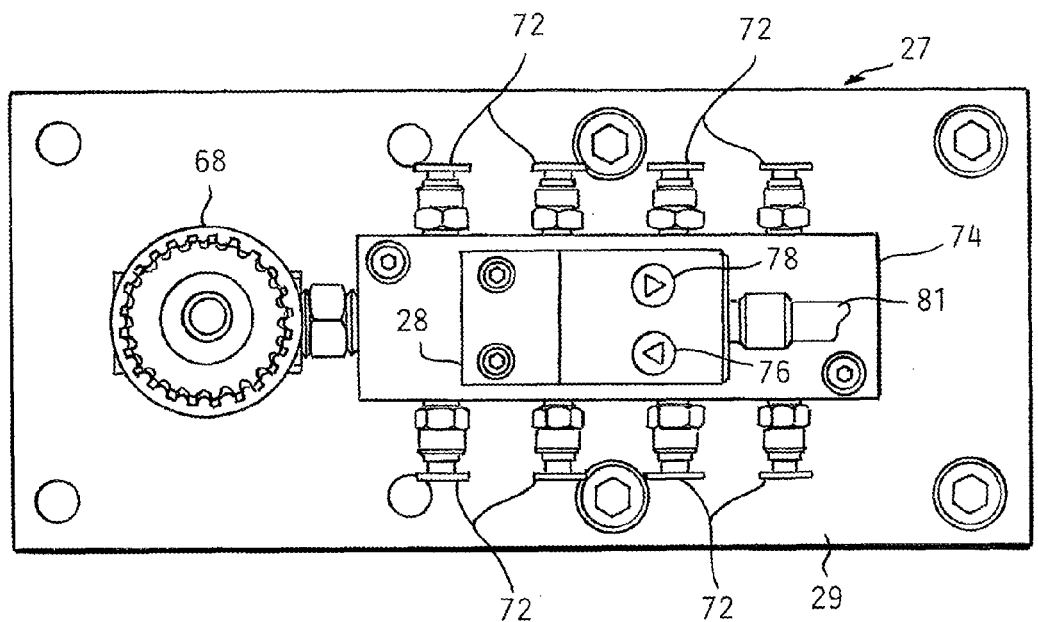
FIG. 12 is a plan top view of the air pressure system of the breakaway tooling apparatus of the present invention.
Figure 13:
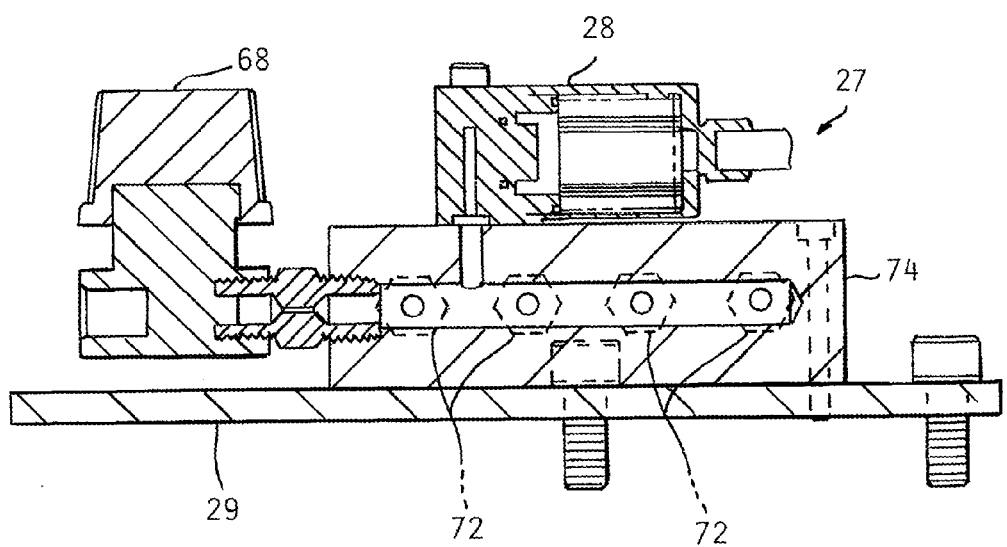
FIG. 13 is a sectional view of the air pressure system of the breakaway tooling apparatus of the present invention.

FIG. 11 shows a circuit diagram 80 for the air pressure system 27 of the breakaway tooling apparatus 10. The circuit diagram 80 shows the flow of pressurized air from the supply of pressurized air into the pressure regulator 68 wherein the pressure regulator 68 monitors the flow of pressurized air through a restriction orifice 82. The regulated air then flows into the air manifold block 74, wherein the air is supplied to a plurality of outlets or air hose fittings 72. When the pressure to the outlets 72 is maintained above a predetermined pressure level, the pressure indicator or switch 28 is maintained in an on position. If any of the outlets 72 are not maintained at a predetermined pressure level, then an electronic signal is sent to the control apparatus, thereby indicating that the detection mount 12 of the breakaway tooling apparatus 10 is fractured. When this occurs, the control apparatus immediately shuts down the manipulator.

In a second embodiment, the detection mount 12 may have the same configuration as previously described. However, the embodiment shown in FIGS. 14-14A does not provide the ring as the blocking member 66. Rather, the end of the boom rod 24 acts as the blocking member 66 by sealing against the flexible O-ring 64. Thus, pressurized air in the air passageway 56 is blocked from passing through the air passageway 56 by the end of the boom rod 24 until the detection mount 12 fractures at the narrowed neck region 54. Once the detection mount 12 fractures at the neck region 54, the seal between the O-ring 64 and the end of the boom rod 24 is broken, and the pressurized air is allowed to pass through the air passageway 56, thereby triggering the pressure indicator or switch 28. The control apparatus then shuts down the manipulator.

In a third embodiment, the detection mount 12 is similar to the first embodiment; however, the detection mount 12 of the third embodiment, as seen in FIGS. 15-15A, provides an air passageway 90 that does not extend through the detection mount 12. Rather, the air passageway 90 provides a blind hole 92 that ends within or adjacent to the neck region 54 of the detection mount 12. Thus, the neck region 54 acts as the blocking member 66 to the air passageway 90 by blocking the hole 92. When the detection mount 12 fractures at the neck region 54, the blind hole 92 of the air passageway 56 is exposed or opened, thereby allowing pressurized air to flow through the air passageway 90 and allowing the pressure indicator or switch 28 to be triggered. The control apparatus then shuts down the manipulator.

In operation, the breakaway tooling apparatus 10 is mounted to the master boom rod 14 of the manipulator. The modular tooling assembly 20 is appropriately mounted to the breakaway tooling apparatus 10 by having the boom rod 24 connected to the lock ring 22 which in turn is connected to the detection mount 12. Depending on the embodiment, the air passageway 56, 90 is blocked by the blocking member 66. The air hose 30 is connected to an air hose fitting 72 of the air manifold block 74, and the opposite end of the air hose 30 is connected to the air hose fitting 58 on the detection mount 12. A supply of pressurized air is provided to the pressure regulator 68, and pressurized air is supplied to the air hose fittings 72 on the air manifold block 74. Pressurized air is then provided to the air passageway 56, 90 within the detection mount 12, and a predetermined level of pressure is maintained in the air passageway 56, 90, as the blocking member 66 prevents pressurized air from exiting the air passageway 56, 90.

If the detection mount 12 of the breakaway tooling apparatus 10 receives a sufficient amount of force at an angle substantially perpendicular to the longitudinal axis 46 of the detection mount 12, the detection mount 12 will fracture at the narrowing neck region 54 between the substantially square mounting region 32 and the substantially cylindrical mounting region 34 of the detection mount 12. When this occurs, the substantially cylindrical mounting region 34 of the detection mount 12 and the modular tooling assembly 20 connected to the substantially cylindrical mounting region 34 of the detection mount 12 will fall away from the substantially square mounting region 32 of the detection mount 12. Although not shown, a safety strap may be incorporated connecting the substantially square mounting region 32 to the substantially cylindrical mounting region 34 on the detection mount 12 to ensure that the modular tooling assembly 20 does not cause further damage when the detection mount 12 fractures. Once the substantially cylindrical mounting region 34 of the detection mount 12 and the modular tooling assembly 20 break away from the substantially square mounting region 32 of the detection mount 12, the blocking member 66 can no longer prohibit pressurized air from passing through the air passageway 56. The level of pressurized air in the air manifold block 74 is then reduced below the predetermined level, and the pressure indicator 28 senses the drop in the level of pressure. Once the pressure drops below the predetermined level, a signal is sent from the pressure indicator 28 to the control apparatus to stop and shut down the manipulator. The fractured detection mount 12 may then be replaced with a new, non-fractured detection mount 12, and the tooling assembly 20 may be reassembled to the detection mount 12. The air hoses 30 are reconfigured to the new detection mount 12, and pressurized air is again supplied to the new detection mount 12. The breakaway tooling apparatus 10 is then ready to be used again by the manipulator.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A breakaway tooling apparatus, comprising:
a rigid, one-piece detection mount that includes a peripheral wall that extends around a bore, wherein the detection mount is connectable to a manipulator, the bore is adapted to receive at least one tool, and a thickness of the peripheral wall varies from a maximum thickness to a minimum thickness at a weakened portion for allowing said detection mount to fracture at said weakened portion upon the realization of a predetermined force to said detection mount;
said detection mount having an air passageway that is disposed within the wall of the detection mount and at least partially within the weakened portion thereof and is not in communication with the bore of the detection mount prior to fracturing of the detection mount, and said air passageway in communication with a pressurized air source for delivering pressurized air to said passageway; and
a pressure sensor in communication with said pressured air for determining whether said pressurized air in said air passageway is below a predetermined level of air pressure, thereby indicating whether said detection mount is fractured at said weakened portion.

2. The breakaway tooling apparatus stated in claim 1, further comprising:
said air passageway in said detection mount extending from a first end to a second end, wherein said first end is in communication with said pressurized air source and said second end is closed ended and is located within said wall of said detection mount.

3. The breakaway tooling apparatus stated in claim 1, further comprising:
an air pressure regulator in communication with said pressurized air source for regulating and monitoring the level of pressurized air to said air passageway in said detection mount.

4. The breakaway tooling apparatus stated in claim 1, further comprising:
said weakened portion of said detection mount created by a narrowing neck region of said detection mount such that said detection mount will fracture at said narrowing neck region upon the realization of a predetermined force applied to said detection mount.

5. A breakaway tooling apparatus, comprising:
a rigid, one-piece detection mount that includes a peripheral wall that extends around a bore, wherein the detection mount is connectable to a manipulator and at least one tool, the wall defines an inner surface and an outer surface, the inner surface of the wall defines a shoulder that extends substantially perpendicular to a longitudinal axis of the bore, a recess is formed in the shoulder, and a thickness of the peripheral wall varies from a maximum thickness to a minimum thickness at a weakened portion of the detection mount that is located adjacent to said shoulder for allowing said detection mount to fracture at said weakened portion upon the realization of a predetermined force to said detection mount;
said detection mount having an air passageway extending from said outer surface of said detection mount to a port on said shoulder on said inner surface of said wall of said detection mount;
a blocking member located in said bore and in engagement with said shoulder;
a sealing member that is located in said recess and extends around said port, wherein the sealing member is engageable with the blocking ring to seal the air passageway with respect to the bore of the detection mount such that the air passageway is not in communication with the bore of the detection mount;
said air passageway in communication with a pressurized air source at said outer surface of said detection mount such that said pressurized air is prohibited from passing through said air passageway to said inner surface of said detection mount when said detection mount is not fractured at said weakened portion, and said pressurized air being allowed to pass through said air passageway to said bore of said detection mount when said detection mount is fractured at said weakened portion; and a pressure sensor in communication with said pressurized air source for determining whether said pressurized air in said air passageway is below a predetermined level of air pressure, thereby indicating whether said detection mount is fractured at said weakened portion.

6. The breakaway tooling apparatus stated in claim 5, further comprising:

said blocking member having a substantially cylindrical ring configuration.

7. The breakaway tooling apparatus stated in claim 5, further comprising:

an air pressure regulator in communication with said pressurized air source for regulating and monitoring the level of pressurized air to said air passageway in said detection mount.

8. A breakaway tooling apparatus, comprising:

a rigid, one-piece detection mount that includes a peripheral wall that extends around a bore, wherein the detection mount is connectable to a manipulator, the wall defines an inner surface and an outer surface, the inner surface of the wall defines a shoulder that extends substantially perpendicular to a longitudinal axis of the bore, a recess is formed in the shoulder, and a thickness of the peripheral wall varies from a maximum thickness to a minimum thickness at a weakened portion of said detection mount that is located adjacent to the shoulder for allowing said detection mount to fracture at said weakened portion upon the realization of a predetermined force applied to said detection mount;

an air passageway extending from an outer surface of said detection mount to a port on said shoulder, wherein said port is in close proximity to said weakened portion of said detection mount;

a tool located in said bore and in engagement with said shoulder;

a sealing member that is located in said recess and extends around said port, wherein the sealing member is engageable with the tool ring to seal the air passageway with respect to the bore of the detection mount such that the air passageway is not in communication with the bore of the detection mount; and said air passageway in communication with a pressurized air source at said outer surface of said detection mount, wherein said pressurized air is prohibited from passing through said air passageway at said port when said detection mount is not fractured at said weakened portion, and wherein said port disengages from said sealing member to allow said pressurized air is allowed to pass through said air passageway at said port when said detection mount is fractured at said weakened portion of said detection mount.

9. The breakaway tooling apparatus stated in claim 8, further comprising:

a pressure sensor in communication with said pressurized air for determining whether said pressurized air in said air passageway is below a predetermined level of air pressure, thereby indicating whether said detection mount is fractured at said weakened portion; and an air pressure regulator in communication with said pressurized air source for regulating and monitoring a level of pressurized air to said air passageway in said detection mount.

* * * * *

UNITED STATES PATENT AND TRADEMARK OFFICE
CERTIFICATE OF CORRECTION

| | | |
|---|---|---|
| PATENT NO. | : 8,443,653 B2 | Page 1 of 1 |
| APPLICATION NO. | : 12/620706 | |
| DATED | : May 21, 2013 | |
| INVENTOR(S) | : Kenneth P. Dellach | |

It is certified that error appears in the above-identified patent and that said Letters Patent is hereby corrected as shown below:

In the Claims

In Column 10, line 19, please delete "is allowed."

Signed and Sealed this
Twenty-fifth Day of June, 2013

Teresa Stanek Rea
*Acting Director of the United States Patent and Trademark Office*